(12) United States Patent
Delzer et al.

(10) Patent No.: US 6,969,044 B2
(45) Date of Patent: Nov. 29, 2005

(54) APPARATUS FOR CONTROLLING A FLUID DISCHARGE

(76) Inventors: Wayne M. Delzer, 1526 S. Dover Ct., Lakewood, CO (US) 80232; Thomas J. Isbester, 733 Cave Creek Ct., Fairplay, CO (US) 80440

( * ) Notice: Subject to any disclaimer, the term of this patent is extended or adjusted under 35 U.S.C. 154(b) by 0 days.

(21) Appl. No.: 10/707,317

(22) Filed: Dec. 5, 2003

(65) Prior Publication Data

US 2005/0121639 A1 Jun. 9, 2005

(51) Int. Cl.[7] ............................................. F16K 51/00
(52) U.S. Cl. ...................... 251/147; 251/212; 251/300
(58) Field of Search ............................ 251/300, 212, 251/147

(56) References Cited

U.S. PATENT DOCUMENTS

| | | |
|---|---|---|
| 892,944 A | 7/1908 | Drawe |
| 2,742,324 A | 4/1956 | Kerensky .................... 299/118 |
| 3,123,334 A | 3/1964 | Hitz ............................ 251/147 |
| 3,998,426 A | 12/1976 | Isbester ...................... 251/147 |
| 4,007,909 A | 2/1977 | Buseth et al. ............. 251/149.2 |
| 4,671,310 A | 6/1987 | Henninger .................. 137/242 |
| 4,844,292 A * | 7/1989 | Lonardi et al. ............. 251/212 |
| 5,618,027 A | 4/1997 | Nevrekar ..................... 251/302 |
| 5,692,470 A | 12/1997 | Sattler et al. ............... 123/337 |
| 6,578,743 B1 * | 6/2003 | Kokeisl ...................... 222/506 |
| 6,588,728 B2 * | 7/2003 | Kubitschek et al. ........ 251/212 |
| 2002/0125455 A1 | 9/2002 | Kubitschek et al. ........ 251/326 |

* cited by examiner

Primary Examiner—John Bastianelli
(74) Attorney, Agent, or Firm—Roger A. Jackson

(57) ABSTRACT

An apparatus for controlling a fluid discharge through an opening in a conduit includes a conduit section, conduit inlet, conduit interior, conduit exterior, and a conduit outlet or opening having a continuously curved perimeter surface with oppositely disposed concave sections and convex sections that are continuous. Also, first and second curved gate members are rotatably mounted and are axially slidably lockably engaged to the conduit exterior including structure to move the gate members symmetrically from a closed position to an open position remaining adjacent to the outlet, the gate members in the closed position are adjacent to the outlet and are adjacent to each other. In addition, fluid sealing between the outlet and the gate members, between the gate members, and between the gate members and the outlet, when the gate members are in the closed position. The gate members are operational to control the fluid discharge through the outlet.

36 Claims, 5 Drawing Sheets

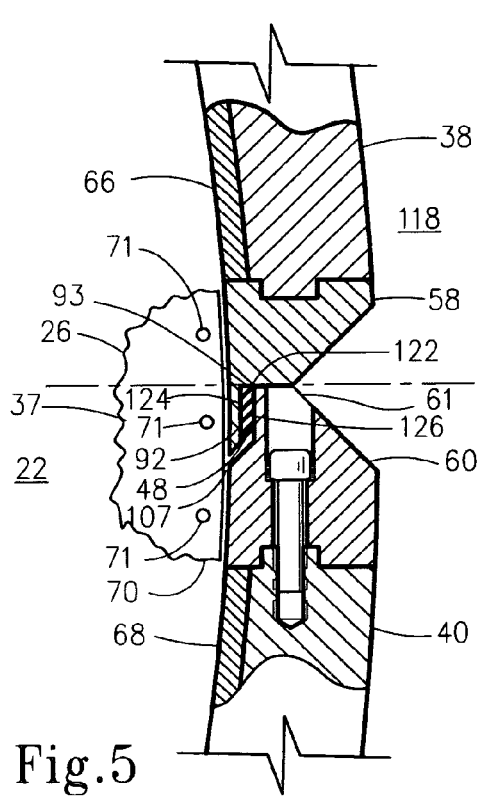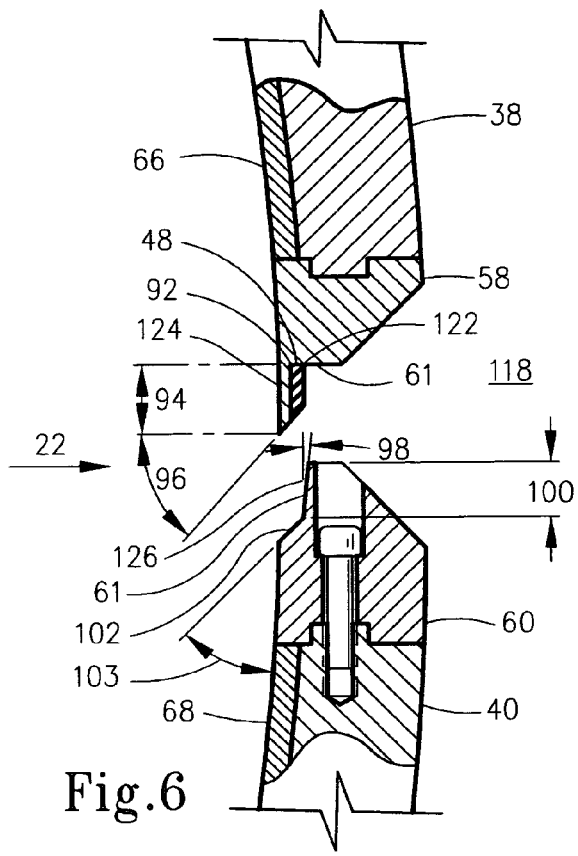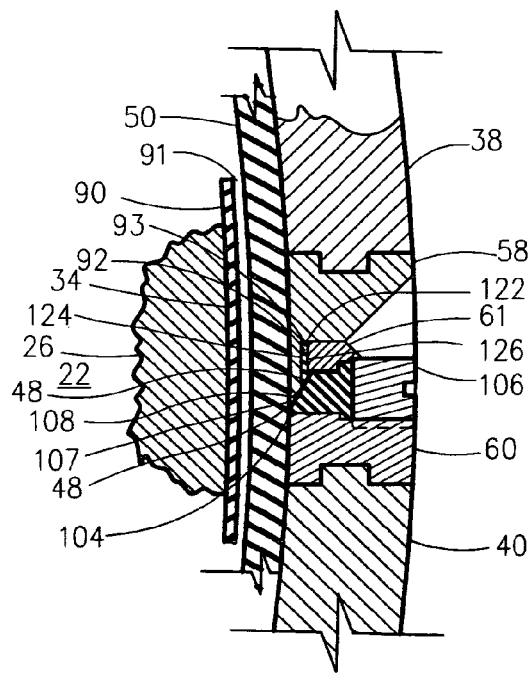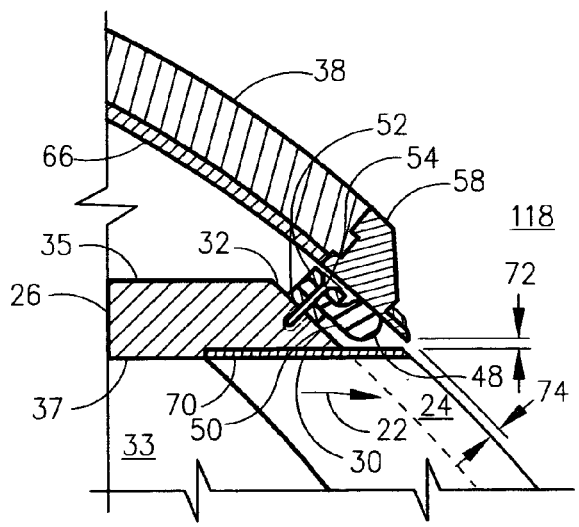

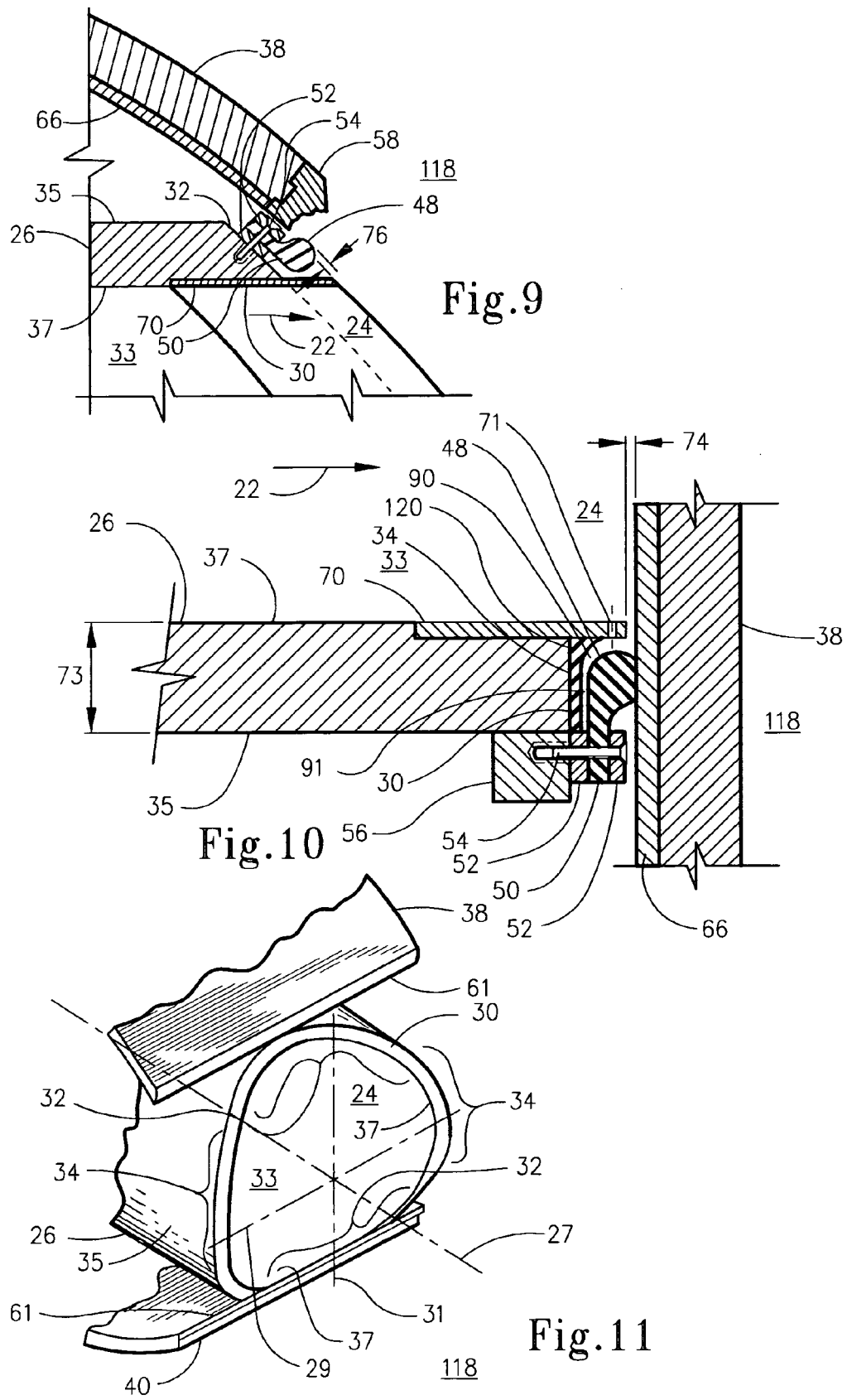

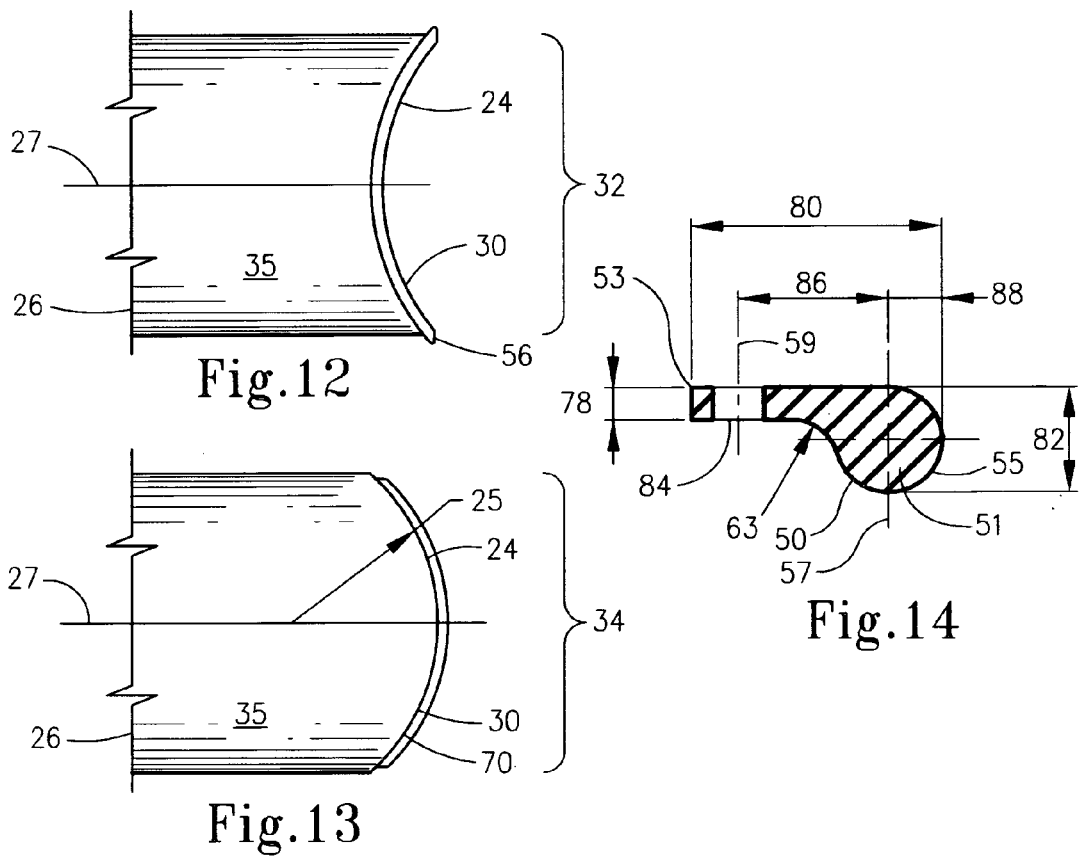
Fig.12
Fig.14
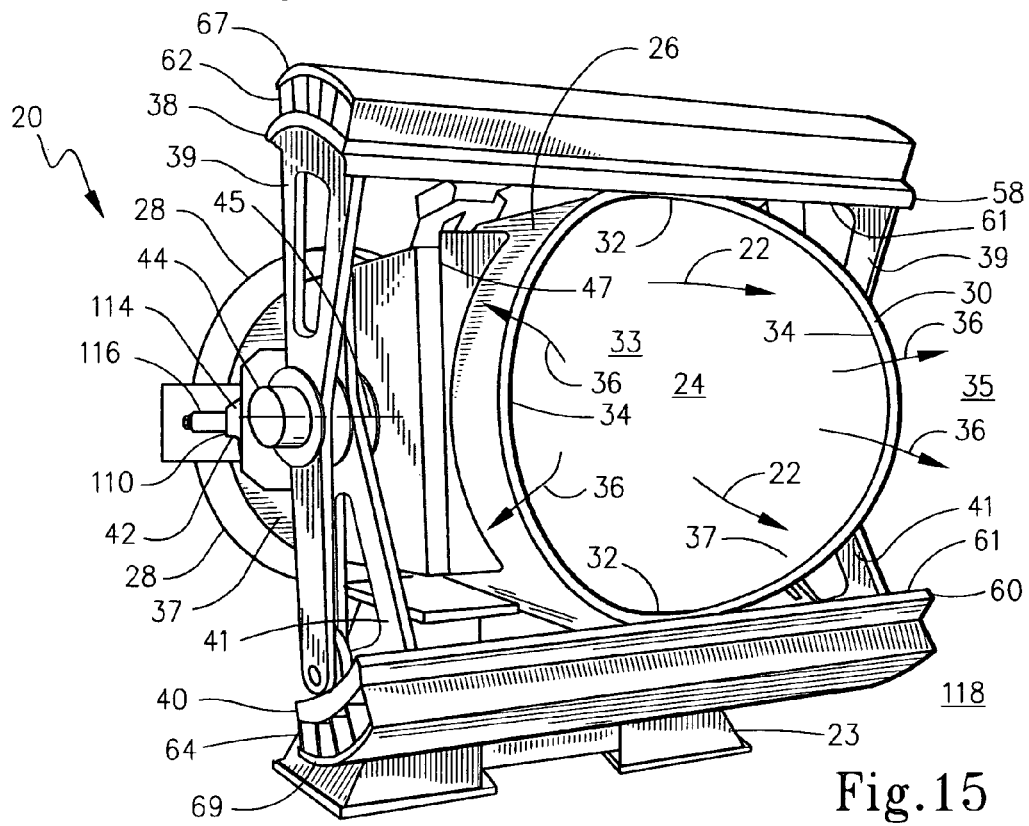
Fig.13
Fig.15

APPARATUS FOR CONTROLLING A FLUID DISCHARGE

TECHNICAL FIELD

The present invention relates generally to an apparatus for controlling a fluid discharge through an opening in a conduit. More particularly, the present invention relates to flow control valves utilizing clam shell type controlled gates mounted to the exterior of a hydraulic flow conduit for positive discharge fluid flow control through the hydraulic conduit while minimizing the occurrence of fluid cavitation at the conduit outlet or opening.

BACKGROUND OF INVENTION

Various fluid control valve technologies are well known in the prior art, in looking particularly at relatively large size heavy duty control valve apparatus that are generally incorporated at the outlets of large hydraulic conduits, particularly in river, dam, and canal outlet works, or bypass lines, and energy dissipators that are either submerged (completely within the fluid) or free releases (open to atmosphere) at the valve outlet. The purpose of these valves is to variably restrict fluid discharge flow through the outlets, and are preferably controllable between a fully open position and a fully closed position, wherein in the fully closed position the valve has a minimal amount of fluid leakage that is acceptable for its intended use. Prior art heavy duty control valve and/or gate apparatus has included jet flow gates, fixed cone valves, tube valves, slide valves, wheel valves, mounted valves, radial valves, top seal radial valves, roller gate valves, needle valves, hollow jet valves, ensign valves (upstream control), and butterfly valves. These valves are positioned in line with the outlet and by their design nature interfere or are "in stream" with the fluid flow as a means for controlling the fluid flow through the valve outlet. Therefore, the aforementioned valves are generally of the type that are mounted within or inside of the conduit and extend with a control structure or apparatus from the inside of the conduit to the exterior of the conduit.

There are inherent disadvantages to mounting the valve within the conduit and in the fluid flow stream; firstly, the valve surface may contain changes in curvature, discontinuities, vanes, or shafts, and the like which make it difficult for the flow to follow the surface and may cause flow separation that can lead to cavitation. This aforementioned cavitation in the conduit stems from low hydraulic pressure pockets, that reach the fluid's vapor pressure immediately downstream of the valve surface (for example a surface discontinuity) at the fluid conduit interface, wherein the pocket becomes a gas trapped within the liquid. Picturing a valve inside of a conduit disrupting fluid flow one could draw the analogy to an airplane wing passing through a fluid such as air and by necessity the wing passing through the air creates high and low pressure pockets. In the fluid in a valve this causes difficulty in that the low pressure pockets typically cause a phase change of the fluid from a liquid to a gas, wherein the gas bubbles recompress in the fluid downstream of the valve back to their original phase of being a liquid. The problem with this recompression of the gas bubble within the fluid flow is that it occurs quite violently and can cause damage to valve surfaces in addition to causing a high level of noise. If the recompression of the gas bubble occurs not adjacent to a valve surface, say in midstream flow in a conduit, the result is typically only noise and not valve surface damage, however, the recompression of the gas bubble can hinder the passage of debris within the fluid through the valve. The second inherent disadvantage to mounting the valve within the conduit and in the fluid flow stream is that when the valve is in the fully open position, the valve still remains to some extent in the conduit or in the fluid flow stream. This results in the inability of a valve to allow full free flow of the fluid within the hydraulic conduit, in addition to causing some disruption of fluid flow, which again can increase the risk of fluid cavitation as previously described. In addition, maintenance and inspection of the aforementioned valves is made more difficult by having the valve operational structure within the hydraulic conduit, making access to the valve operational structure more time consuming.

The aforementioned problems with the previously described prior art valves have led to the development in the prior art of another type of valve that uses only the external area of the conduit for the valve structure or apparatus. One type of this prior art valve is called a clamshell gate type of hydraulic flow control valve. The principal advantage of the clamshell type valve is that the interior of the hydraulic conduit is completely unobstructed when the clamshell type valve is in a fully open position and thus helps reduce the incidence of fluid cavitation as previously described. However, it must be noted that a clam shell type valve is typically a hydraulic conduit termination type valve, in other words the clam shell type valve is typically discharging submerged at the end or termination of the hydraulic conduit within the fluid or discharging at the end or termination of the hydraulic conduit to the open atmosphere. It would not be possible for the clamshell type valve to engage in fluid flow control within a hydraulic conduit fluid flow system wherein the clamshell type valve outlet would continue fluid within a hydraulic conduit.

However, clamshell type valves by their very nature in the design have a number of their own inherent problems; firstly, when the clamshell gate members are in the partially or fully open position, the conduit outlet is entirely upstream of the gate leading edge lips, which in turn causes the fluid flow discharge to "fan out" from the conduit outlet, thus creating an unclean jet and associated problems when the fluid flow discharge is into a confined region such as an open flow channel, canyon, and the like by increasing the potential for fluid flow erosion damage extending perpendicular from the direction of the fluid flow out of the conduit outlet. Secondly, another disadvantage of clamshell type valves in is the complexity of the mechanical structure required to pivotally open the clamshell valve members, which must be substantially symmetrically moved to one another to create a substantially balanced hydraulic load against the gate members. One prior art solution in this area is to use a single clamshell radial member to close over the conduit outlet which eliminates the mechanical complexity for a symmetrically opening pair of clamshell gate members, however, the hydraulic loads are significantly unbalanced as against the clamshell gate and require a heavy duty gate attachment and pivot/control structure. A third identified problem with clamshell type valves concerns fluid sealing between the conduit outlet and the clamshell gate members when the valve is the fully closed position. The significance of this third problem depends upon the application and use of the clamshell type valve that dictates an amount of acceptable leakage of the fluid when the valve is in the fully closed position. Resulting in that if leakage of the fluid is not tolerable to requiring a very small leakage of the fluid when a clamshell type valve is in a fully closed position, the requirement for the sealing becomes more complicated between the conduit outlet and the clamshell gate members.

A few similar examples in the prior art are in the U.S. Pat. No. 3,998,426 to Isbester that discloses an apparatus for controlling fluid discharge through an outlet of a conduit utilizing clamshell type gates that are pivotal or operable through either a plate slot arrangement or a yoke link arrangement. In Isbester the seal between the conduit outlet and the gates is either an axially movable collar with a seal on its end or an annular seal on the conduit end itself without the axially movable collar. In addition, Isbester discloses the use of a lip seal between the gate halves interface when the gates are in the fully closed position. Isbester mostly concerns the detail of the gate movement and control structure and does not go into any substantial detail relating to seal design or seal material specifics in association with a required valve closed condition leak rate that would be required for specific applications. In U.S. Pat. No. 2,742,324 to Kerensky disclosed is a hydraulic discharge regulator utilizing a single pivoted clamshell gate for the end of a conduit. Kerensky also discloses a metal sealing ring or alternatively an inflatable sealing ring between the end of the conduit and the clamshell, however, no additional detail on the sealing is disclosed. Similar to Kerensky in U.S. Pat. No. 3,123,334 to Hitz disclosed is a rotary gate valve also utilizing a single pivoted clamshell gate having a flow opening and a solid portion to close the end of a conduit with the seal between the conduit end and the gate being an conventional o ring that is in a prepared groove located at the end of the conduit, however, beyond the use of a conventional o ring, Hitz discloses no additional detail as to the specifics of the sealing between the end of the conduit and the gate. In this same area in using a single clamshell gate in U.S. Pat. No. 5,692,470 to Sattler et al. discloses a throttle body that acts as a valve utilizing a single pivotally attached clamshell gate that has an annular seal between the gate and the throttle body with an option to spring bias the gate against the seal. However, Sattler et al. is differentiated in that the valve is a housing body as opposed to a conduit end, thus allowing more surface area for sealing, gate stops, and mounting of the gate as against the body.

One final prior art example that utilizes flat sliding plates as against a conduit outlet being opposed to the aforementioned pivoted clamshell gates in is U.S. publication number US2002/0125455 A1 to Kubitschek et al. that discloses a modified Isbester flow control gate valve having two approximately 45 degree inclined flat surfaces that have an opening the same size as the conduit internal diameter. In Kubitschek et al. the water flow is controlled by a rectangular pair of flat gate leaves that are operable to slide upon the inclined flat surfaces being held in place by gate guides with the sliding facilitated by an anti friction material. Also, in Kubitschek et al. the movement of the gates is controlled by hydraulic actuators and sealing between the gates on the inclined flat surfaces uses a conventional o ring, also disclosed is a lip seal visor being an external separable assembly having its own positional actuator, there is no disclosure related to the seal required between the o ring and gate interface when the valve is in the fully closed position.

What is needed is a clam shell type valve that retains the inherent advantages of a clam shell type valve as previously discussed being principally the unobstructed fully open position flow of the fluid within the hydraulic conduit in conjunction with the reduced incidence of fluid cavitation, and at the same time overcoming the inherent disadvantages of the clam shell type valve for the fluid to fan out at the conduit outlet, a simpler structure for substantially symmetrically controlling the clamshell gates movement, and the gates position to one another, and finally to have a more sophisticated sealing system to reduce the fluid leakage rate when the clam shell type valve is in the fully closed position.

SUMMARY OF INVENTION

Broadly, the present invention of an apparatus for controlling a fluid discharge through an opening in a conduit includes a conduit section including a conduit inlet, a conduit interior, and a conduit exterior. The conduit section also includes a conduit outlet having a continuously curved perimeter surface defining the conduit opening that includes oppositely disposed concave sections and oppositely disposed convex sections, wherein the concave and convex sections are continuous. The convex sections are operational to reduce fan out of the discharge fluid from the conduit opening. The present invention also includes a first arcuately curved gate member and a second arcuately curved gate member in conjunction with a means for rotatably mounting the first and second gate members externally to the conduit. The first and second gate members are operational to move from a fully closed position to a fully open position, the first and second gate members in the fully closed position are adjacent to the conduit outlet and have an adjacent interface to each other, as the first and second gate members transition to the fully open position from the fully closed position, the first and second gate members remain adjacent to the conduit outlet. The first and second gate members transitioning substantially symmetrically from the fully closed position to the fully open position remaining adjacent to the concave sections in the fully open position. Also included is a means for moving the first and second gate members between the fully closed position and the fully open position, wherein the first and second gate members are operational to control the fluid discharge through the conduit outlet. Finally included, is a means for substantial fluid sealing between the conduit outlet and the first gate member, between the conduit outlet and the second gate member, between the first and second gate members, and between the first and second gate members interface and the conduit outlet, when the first and second gate members are in the fully closed position.

These and other objects of the present invention will become more readily appreciated and understood from a consideration of the following detailed description of the exemplary embodiment(s) of the present invention when taken together with the accompanying drawings, in which;

BRIEF DESCRIPTION OF DRAWINGS

FIG. 5 shows section 5—5 from FIG. 1 specifically detailing the interface between the gate members in the fully closed position;

FIG. 6 also shows section 5—5 from FIG. 1 specifically detailing the interface between the gate members in the partially open position;

FIG. 7 shows section 7—7 from FIG. 1 specifically detailing the interface between the gate members in the fully closed position including an elastomeric plug and setscrew;

FIG. 8 shows section 8—8 from FIG. 2 specifically detailing the interface between the first gate member and the conduit opening with the first gate member in the fully open position;

FIG. 9 also shows section 8—8 from FIG. 2 specifically detailing the interface between the first gate member and the conduit opening with the first gate member in the fully open position with a cutaway showing the uncompressed gate seal;

FIG. 10 shows section 10—10 from FIG. 1 specifically detailing the interface between the first gate member and the conduit opening with the first gate member in the fully closed position;

FIG. 11 shows a perspective end view of the conduit opening with the first and second gate members in the fully opened position, specifically detailing the continuous concave and convex sections of the conduit opening;

FIG. 12 shows a top view of the conduit opening only, specifically detailing the concave section;

FIG. 13 shows a side elevation view of the conduit opening only, specifically detailing the convex section;

FIG. 14 shows a crossection of the gate seal only, taken from the gate seal assemblies of FIGS. 8, 9, and 10; and FIG. 15 shows a perspective use view of the apparatus for controlling a fluid discharge with the gate members in the fully open position indicating the fluid flows.

REFERENCE NUMBER IN DRAWINGS

Figure 1:
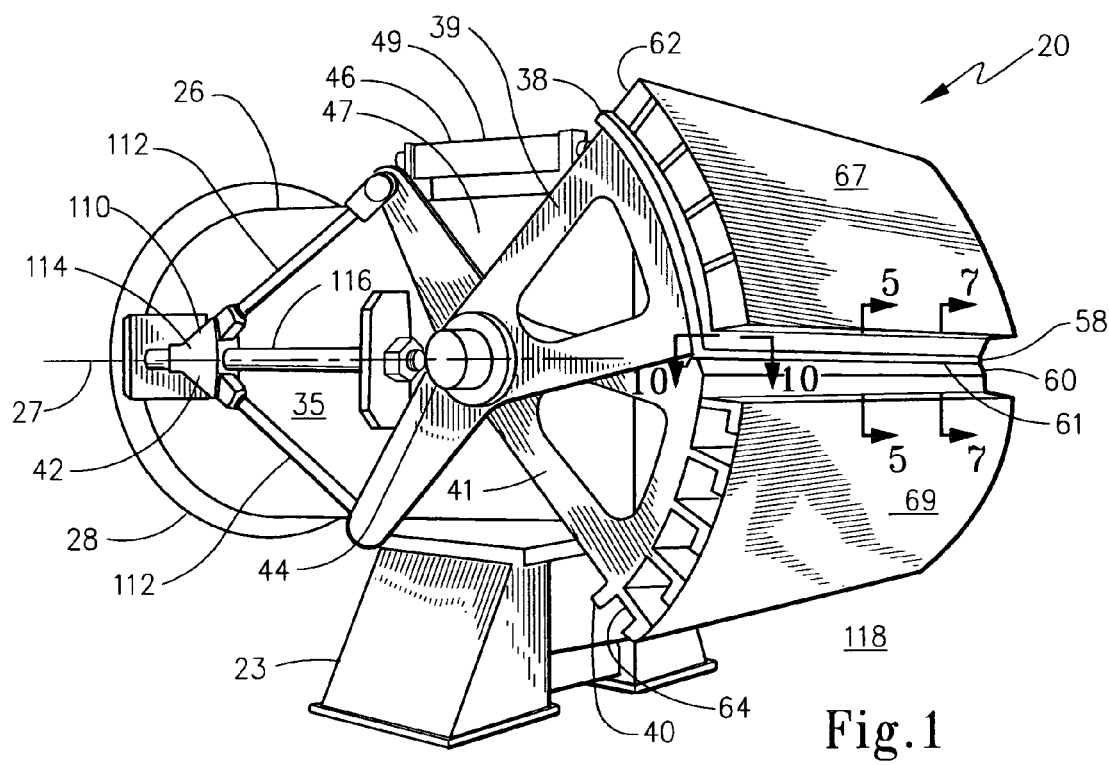
FIG. 1 shows a perspective view of the apparatus for controlling a fluid discharge with the gate members in the fully closed position.

20 Apparatus for controlling a fluid discharge
22 Fluid discharge
23 Conduit base
24 Conduit opening
25 Conduit outlet convex section radius
26 Conduit
27 Conduit longitudinal axis
28 Conduit inlet
29 Conduit X axis at the conduit outlet
30 Conduit outlet or opening
31 Conduit Y axis at the conduit outlet
32 Conduit outlet concave section
33 Conduit interior
34 Conduit outlet convex section
35 Conduit exterior
36 Discharge fluid fan out
37 Conduit interior surface
38 First arcuately curved gate member
39 First curved gate member support arms
40 Second arcuately curved gate member
41 Second curved gate member support arms
42 Means for rotatably mounting gate members externally to the conduit
44 Trunnion rotatable mounts of gate members externally to the conduit
45 Trunnion shaft longitudinal axis
46 Means for moving gate members
47 Trunnion slidable lockable engagement to the conduit exterior
48 Means for substantial fluid sealing
49 Linear actuator
50 Gate seal
51 Gate seal bulb
52 Gate seal mounting clamp set
53 Gate seal tangential extension
54 Fastener for gate seal and mounting clamp set
55 Gate seal bulb periphery
56 Gate seal mounting clamp set support bar
57 Gate seal bulb centerline
58 First curved gate member seat
59 Gate seal aperture centerline
60 Second curved gate member seat
61 Labyrinth interface
62 First curved gate member structure
63 Gate seal bulb periphery to tangential extension radius
64 Second curved gate member structure
66 First curved gate member skin plate
67 First curved gate member debris plate
68 Second curved gate member skin plate
69 Second curved gate member debris plate
70 Conduit outlet flow ring
71 Conduit outlet flow ring apertures
72 Gate fully open position flowring clearance
73 Conduit wall thickness
74 Gate flow plate clearance
76 Gate seal interference
78 Gate seal mounting base thickness
80 Gate seal overall length
82 Gate seal bulb diameter
84 Gate seal mounting aperture
86 Gate seal mounting aperture distance to bulb center line
88 Gate seal bulb centerline to bulb outer periphery
90 Gate seal support elastomeric segment
91 Gate seal fluid chamber
92 Elastomeric strip
93 Elastomeric strip cavity
94 Elastomeric strip support length
96 First gate member seat angle at labyrinth
98 Second gate member seat elastomeric strip contact angle
100 Second gate member seat elastomeric strip contact length
102 Second gate member seat clearance surface at labyrinth
103 Second gate member seat clearance surface angle at labyrinth
104 Elastomeric plug
106 Elastomeric plug setscrew
107 Labyrinth split line
108 Elastomeric plug trim area
110 Linkage assembly
112 Link rods
114 Guide
116 Guide rod
118 External environment
120 Clearance between elastomeric segment and gate seal
122 Right triangle portion perpendicular side one of cavity
124 Right triangle portion perpendicular side two of cavity
126 Right triangle portion angled side of cavity

DETAILED DESCRIPTION

Figure 2:
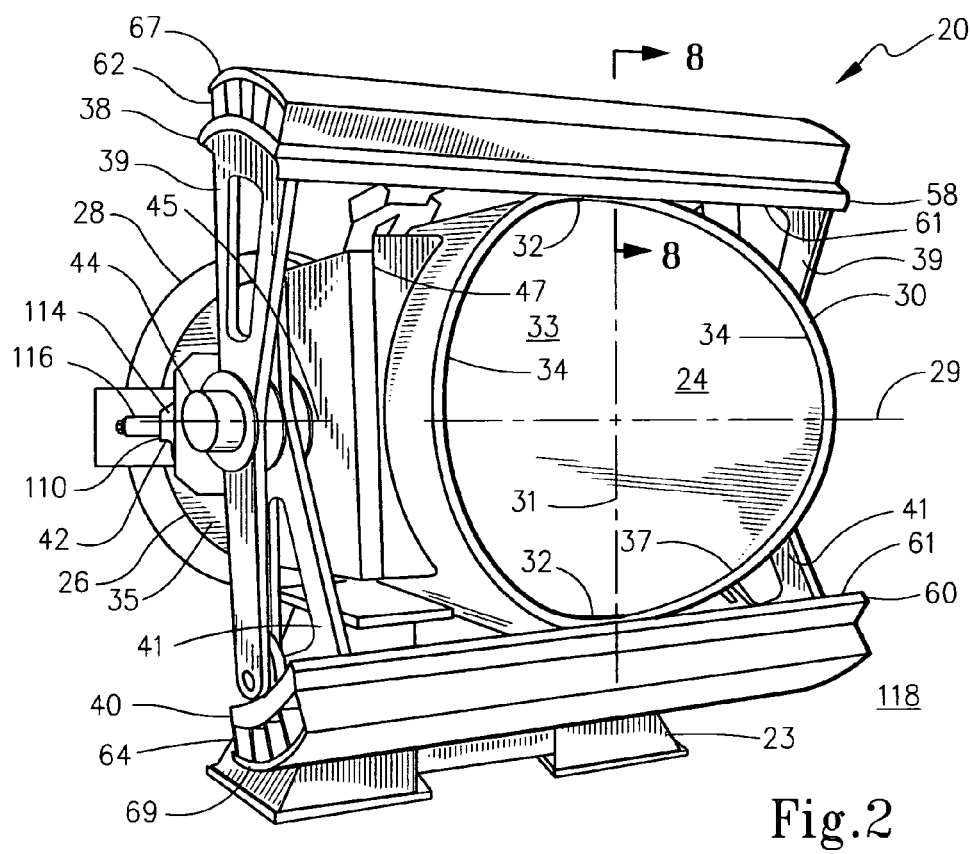
FIG. 2 shows a perspective view of the apparatus for controlling a fluid discharge with the gate members in the fully open position.
Figure 3:
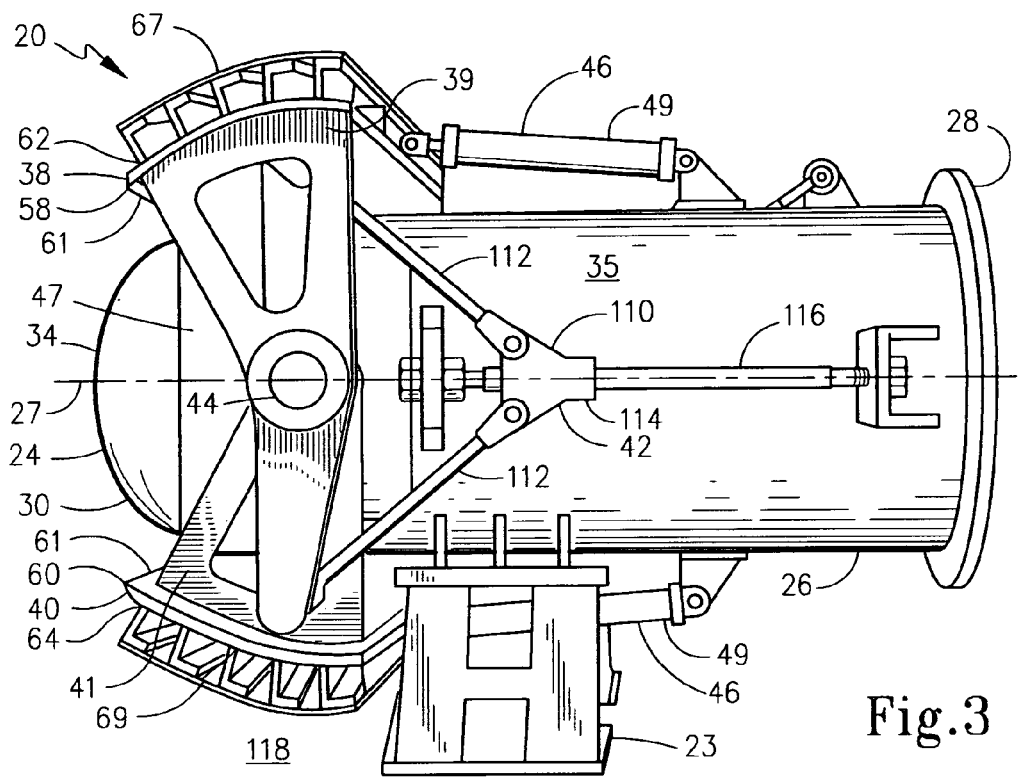
FIG. 3 shows a side elevation view of the apparatus for controlling a fluid discharge with the gate members in the fully open position.
Figure 4:
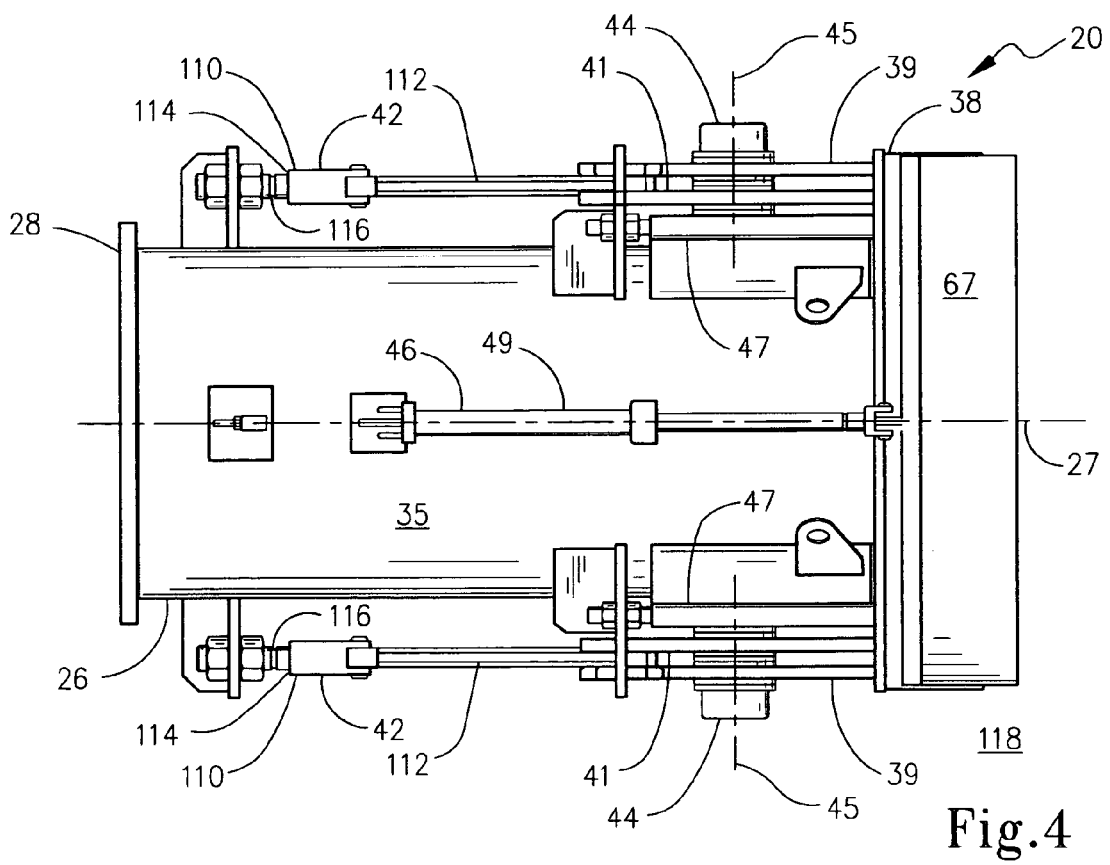
FIG. 4 shows a top view of the apparatus for controlling a fluid discharge with the gate members in the fully closed position.

With initial reference to FIGS. 1 through 4, and FIGS. 11 through 13, which detail the physical structure of the apparatus for controlling a fluid discharge 20 and to FIG. 15 that shows the fluid discharge 22 operational characteristics of the apparatus for controlling a fluid discharge 20 the following description is given. FIG. 1 shows a perspective view of the apparatus for controlling a fluid discharge 20 with the first arcuately curved gate member 38 and the second arcuately curved gate member 40 in the fully closed position. FIG. 2 shows a perspective view of the apparatus for controlling a fluid discharge 20 with the first arcuately curved gate member 38 and the second arcuately curved gate member 40 in the fully open position. FIG. 3 shows a side elevation view of the apparatus for controlling a fluid discharge 20 with the first arcuately curved gate member 38 and the second arcuately curved gate member 40 in the fully open position. FIG. 4 shows a top view of the apparatus for controlling a fluid discharge 20 with the first arcuately curved gate member 38 and the second arcuately curved gate member 40 in the fully closed position. FIG. 11 shows a perspective end view of the conduit opening 30 with the first arcuately curved gate member 38 and the second arcuately curved gate member 40 in the fully opened position, specifically detailing the continuous concave 32 and convex 34 sections of the conduit opening 30. FIG. 12 shows a top view of the conduit opening 30 only, specifically detailing the concave section 32. FIG. 13 shows a side elevation view of the conduit opening only 30, specifically detailing the convex section 34. FIG. 15 shows a perspective use view of the apparatus for controlling a fluid discharge 20 with the first arcuately curved gate member 38 and the second arcuately curved gate member 40 in the fully open position indicating the fluid discharge flows 22 and discharge "fan out" 36 fluid flow, note however, that the "fan out" 36 fluid flow typically occurs with the first arcuately curved gate member 38 and the second arcuately curved gate member 40 in the partially open position. The preferred constructions described are for the exemplary embodiment of the apparatus for controlling a fluid discharge 20, however, these preferred constructions are not limiting in that other sizes, materials, and construction and/or fabrication methods could be used as dictated by a particular installation and application.

Focusing more particularly on the apparatus for controlling a fluid discharge 20 through an opening in a conduit 24, and specifically upon the conduit section 26, the apparatus for controlling a fluid discharge 20 includes a conduit section 26 that includes a conduit inlet 28, a conduit interior 33, and a conduit exterior 35. The conduit section 26 also includes a conduit outlet or opening 30 having a continuously curved perimeter surface defining the conduit opening 30 that includes oppositely disposed concave sections 32 and oppositely disposed convex sections 34, wherein the concave 32 and convex 34 sections are continuous. The convex sections 34 are operational to reduce discharge fluid "fan out" 36 of the discharge fluid 22 from the conduit opening 30 as best shown in FIG. 15. Reducing the potential of the fluid flow discharge to "fan out" 36 from the conduit outlet 30, helps prevent creating an unclean jet and associated problems when the fluid discharge flow 22 is into a confined region such as an open flow channel, canyon, and the like by decreasing the potential for fluid flow 22 erosion damage extending perpendicular from the direction of the fluid flow 22 out of the conduit outlet 30. The conduit section 26 has a conduit longitudinal axis 27 and looking specifically to the conduit outlet 30, a conduit X axis 29 and a conduit Y axis 31 (as best shown in FIGS. 2 and 11) for orientation of the first arcuately curved gate member 38 and the second arcuately curved gate member 40 to the conduit section 26. The conduit section 26 is a conventional, heavy duty type of conduit used for transferring large quantities of fluid, typically used in the irrigation, municipal water supplies, and hydro electric applications. The conduit section 26 is normally circular in cross section having a forty eight (48) inch diameter in the exemplary embodiment and being of rolled or extruded construction and is of a length suitable for the various attachments on the conduit exterior 35 as will be subsequently described for the apparatus for controlling a fluid discharge 20. Also, the conduit section 26 is preferably of an increased wall thickness 73 as best shown in FIG. 10, as required by conventional structural engineering calculations for the conduit section 26 to have sufficient structural strength for the apparatus for controlling a fluid discharge 20, relating to pressure and temperature operating parameters, and other forces and loads. In addition, conduit section 26 that is normally circular in cross section having a forty eight (48) inch diameter in the exemplary embodiment in forming the convex section 34 on the conduit outlet 30, a radius 25, which is preferably about two foot, eight and five sixteenths inches (2" 8⅝₁₆") is best shown in FIG. 13. Cutting the radius 25 at the conduit outlet 30 as described above to form the convex section 34 results in the concave section 32 resultantly forming at the conduit outlet 30. However, the conduit section 26 diameter, length, and concave radius/convex radius can vary depending upon the specifics of the particular application of the apparatus for controlling a fluid discharge 20. The conduit inlet 28 is a conventional attachment interface such as a flanged connection utilizing studs, nuts, and a gasket, normally connection to a fluid source that is desired to be controlled, such as a dam outlet, irrigation storage, and the like. Materials of construction of the conduit section 26 are preferably structural carbon steel, however, alternate materials would be acceptable such as stainless steel, or a plating or cladding of a combination of carbon steel and stainless steel, or other materials suitable for the fluid and environmental conditions. The conduit section 26 can be supported by a base 23 (as best shown in FIGS. 1 through 3) that also preferably constructed of structural carbon steel that is designed for a particular application installation of the apparatus for controlling a fluid discharge 20, the base could also be constructed of alternate materials as would be acceptable for a particular installation. As in typical in the aforementioned application for the apparatus for controlling a fluid discharge 20 the base 23 is preferably filled with grout at installation for added strength, corrosion resistance, and vibration dampening, alternatively grout in the base 23 may not be required depending upon the base 23 strength, corrosion risk, and vibration dampening characteristics for a specific application.

Looking particularly at the conduit opening 30 as is best shown in FIGS. 2, 3, 11, 12, 13, and 15 for the continuously curved perimeter surface defining the conduit opening 30 that includes oppositely disposed concave sections 32 and oppositely disposed convex sections 34, wherein the concave 32 and convex 34 sections are continuous, FIGS. 11, 12, and 13 show the conduit opening 30 best. As the conduit opening 30 includes a face that is substantially equal to the wall thickness of the conduit section 26 an option is provided for, that can effectively increase the face width or size of the conduit opening 30 by adding a support bar 56 (as best shown in FIG. 10) constructed of a material compatible to the conduit section 26 and attached to the conduit exterior 35 by welding, fasteners, and the like. The support bar 56 can completely surround the conduit exterior 35 or multiple segments or portions thereof as required. The attachment methods of the aforementioned and subsequently described conduit section 26 features and adjacent attachments utilize convention structural steel construction such as welding, fasteners, shrink fits, and the like.

Further included in the apparatus for controlling a fluid discharge 20 is a first arcuately curved gate member 38 and a second arcuately curved gate member 40. The first arcuately curved gate member 38 and the second arcuately curved gate member 40 each have a radius of curvature to match that of the conduit outlet 30 and maintain a close clearance between the first arcuately curved gate member 38 and the second arcuately curved gate member 40 and the conduit outlet 30 throughout the range of movement between the fully closed position as shown in FIG. 1 and the fully open position as shown in FIG. 2. The materials of construction of the first gate member 38 and the second gate member 40 are preferably two (2) inch thick stainless steel curved plate (as best shown in FIG. 7), or alternatively a first stainless steel skin plate 66 adjacent to the first gate member 38 and a second stainless steel skin plate 68 adjacent to the second gate member 40 (as best shown in FIGS. 5, 8, and 9). The first skin plate 66 and the second skin plate 68 allow the first gate member 38 and the second gate member 40 to be constructed of structural carbon steel as the first skin plate 66 and the second skin plate 68 face the fluid flow 22 as the first 38 and second 40 gate members move towards the fully closed position. The attachment of the first skin plate 66 and the second skin plate 68 to the first gate member 38 and the second gate member 40 respectively are by conventional methods such as welding, fasteners, adhesives, cladding, and the like. Optionally, if the hydraulic loads require additional strength of the first 38 and second 40 gate members to prevent excessive deflection, the first arcuately curved gate member 38 can have additional structure 62 and the second arcuately curved gate member 40 each can have additional structure 64 to be placed upon the outer or non fluid 22 side of the first 38 and second 40 gate members. This is to further brace the first 38 and second 40 gate members against excessive deflection due to hydraulic loads especially as the first 38 and second 40 gate members move towards the fully closed position from the fully open position, wherein the deflection of the first 38 and second 40 gate members can make the fluid sealing more difficult between the first 38 and second 40 gate members and the conduit outlet 30 (as best shown in FIGS. 1 through 3). The first gate structure 62 and the second gate structure 64 are preferably constructed of built up structural steel utilizing "L" shaped beams sized one (1) inch by five (5) inch for a beam web and two (2) inch by five (5) inch for a beam flange positioned substantially parallel to the conduit X axis 29 with one (1) inch and one half (½) inch stiffener plates positioned perpendicular to the beam webs as required by conventional design calculations. Also, a first gate member debris plate 67 and a second gate member debris plate 69 can be attached by welding, fasteners, and the like to the beam flanges forming the outer most portion of the first gate member 38 and the second gate member 40 to help keep debris out of the first gate structure 62 and the second gate structure 64 on the side of the first 38 and second 40 gate members on the side opposite of the fluid discharge 22.

Continuing further on the apparatus for controlling a fluid discharge 20 also included is a means 42 for rotatably mounting the first 38 and second 40 gate members externally 35 to the conduit 26. Functionally, the first 38 and second 40 gate members are operational to move from a fully closed position (see FIGS. 1 and 4) to a fully open position (see FIGS. 2, 3, 11, and 15), the first 38 and second 40 gate members in the fully closed position are adjacent to the conduit outlet 30 and have an adjacent interface to each other (as best shown in FIGS. 5, 6, 7, and 10). As the first 38 and second 40 gate members transition to the fully open position (as best shown in FIGS. 2, 3, 8, 9, 11, and 15) from the fully closed position (as best shown in FIGS. 1, 5, and 7) the first 38 and second 40 gate members remain adjacent to the conduit outlet 30. The first 38 and second 40 gate members transitioning substantially symmetrically in opposite directions from the fully closed position to the fully open position and vice versa, remaining adjacent to the concave sections 32 in the fully open position (as best shown in FIGS. 2, 8, 9, 11, and 15).

The means 42 for rotatably mounting the first 38 and second 40 gate members externally 35 to the conduit 26 is preferably constructed of a pair of trunnions 44. Each trunnion 44 is adjacent to an opposite side of the conduit exterior 35 (as best shown in FIGS. 1, 2, 3, 4, and 15). In the exemplary embodiment, the each trunnion 44 includes an approximately ten (10) inch diameter structural carbon steel shaft extending from the conduit exterior 35 positioned such that the trunnion 44 shaft longitudinal axis 45 is substantially perpendicular to the conduit longitudinal axis 27. The trunnions 44 are oppositely disposed on the conduit exterior 35 sharing approximately the same longitudinal axis 45 as best depicted in FIG. 4. The trunnions 44 can alternatively be different sizes and materials as hydraulic loads and the size of the apparatus for controlling a fluid discharge 20 and more specifically the size of the conduit 26 as dictated by conventional engineering calculations. Optionally, each of the trunnions 44 that is adjacent to an opposite side of the conduit exterior 35 is preferably attached to the conduit exterior 35 by a slidable lockable engagement 47 (as best shown in FIGS. 2, 4, and 15) that is operational to allow the trunnions 44 to move substantially parallel to the longitudinal axis 27 relative to the conduit section 26 allowing a clearance 74 (as best shown in FIG. 8) to be set between the conduit outlet 30 and the first 38 and second 40 gate members. The slidable lockable engagement 47 between the trunnions 44 and the conduit exterior 35 can be accomplished by the use of adjacent slidable plates wherein the outermost plate has slots elongated substantially parallel to the conduit longitudinal axis 27, and the innermost plate is attached to the conduit exterior 35. The slots in the outermost plate preferably receiving a threaded stud from the innermost plate, thus the slotted plate can slide substantially parallel to the conduit longitudinal axis 27 and be lockable by threading a nut to the threaded stud to clamp the slidable plate to the stationary plate on the conduit exterior 35, with preferably a plurality of slots, studs, and nuts utilized for the slidable lockable engagement 47 as previously described. Other combinations of bolts and nuts or other type fasteners that provide for the slidable lockable engagement 47 as previously described would be acceptable also.

Also included in the means 42 for rotatably mounting the first 38 and second 40 gate members externally 35 to the conduit 26 is a first set of support arms 39 attached to the first gate member 38, the first set of support arms 39 are also rotatably attached to the trunnions 44, and a second set of support arms 41 attached to the second gate member 40, the second set of support arms 41 are also rotatably attached to the trunnions 44. The trunnions 44, first set of support arms 39, and second set of support arms 41 are operational to move the first 38 and second 40 gate members from a fully closed position (as best shown in FIGS. 1 and 4) to a fully open position (as best shown in FIGS. 2, 3, and 15) and vice versa. The first 38 and second 40 gate members in the fully closed position are adjacent to the conduit outlet 30 and have an adjacent interface to each other (as best shown in FIGS.

5, 6, and 7). The first 39 and second 41 set of support arms are preferably constructed of one and one half (1½) inch thick structural carbon steel plate that is attached to the first 38 and second 40 gate members respectively preferably by welding. Alternative sizes and materials for the first 39 and second 41 set of support arms could be used depending again upon the hydraulic loads and size of the apparatus for controlling a fluid discharge 20, environmental corrosion resistance, and more specifically the size of the conduit 26. Again as the first 38 and second 40 gate members transition to the fully open position reference FIGS. 2, 8, 9, 11, and 15, from the fully closed position reference FIGS. 1, 5, and 7, the first 38 and second 40 gate members remain adjacent to the conduit outlet 30, with the first 38 and second 40 gate members in the fully open position remaining adjacent to the concave sections 32 in the fully open position reference FIGS. 2, 8, 9, 11, and 15.

Optionally, also further included in the means 42 for rotatably mounting the first 38 and second 40 gate members externally 35 to the conduit 26 is preferably a linkage or linkage assembly 110 that is pivotally attached to the first 39 and second 41 set of support arms, with the linkage 110 also slidably engaged to the conduit exterior 35. More specifically, the linkage 110 includes link rods 112 that are pivotally connected to the first 39 and second 41 set of support arms on one end and pivotally connected to guides 114 on the other end, with the guides 114 being slidably engaged to guide rods 116 that are attached to opposing sides of the conduit exterior 35 as best depicted in FIGS. 1, 3, and 4. The linkage 110 is operational to cause substantially equal and opposite movement of the first 38 and second 40 gate members as the first 38 and second 40 gate members transition from the fully closed position to the fully open position and vice versa in an attempt to more positively balance the hydraulic loads placed upon the first 38 and second 40 gate members from the fluid discharge 22.

Also included in the apparatus for controlling a fluid discharge 20 is a means 46 for moving the first 38 and second 40 gate members between the fully closed position and the fully open position and vice versa, as best shown in FIGS. 1, 3, and 4, wherein the first 38 and second 40 gate members are operational to control the fluid discharge 22 through the conduit outlet 30. The means 46 preferably includes a linear actuator 49 that is attached between the conduit exterior 35 and pivotally attached to the first 38 and second 40 gate members. More particularly, the linear actuator 49 is selected from the group consisting essentially of hydraulic actuators, pneumatic actuators, and mechanical actuators. Specifically, in the exemplary embodiment of the apparatus for controlling a fluid discharge 20 the linear actuator 49 is preferably a pair of linear actuators 49 that are pivotally attached to the conduit exterior 35 on one end and pivotally attached to each of the first 38 and second 40 gate members on the other end wherein the linear actuators 49 are hydraulic cylinders having approximately forty (40) inches of travel being a hydraulic cylinder NFPA style MP1, with a six (6) inch diameter bore and a three (3) inch diameter stem. Other sizes and types of linear actuators would be acceptable depending upon the size of the apparatus for controlling a fluid discharge 20 and specifically the size of the conduit section 26 and the resultant hydraulic loads to be accommodated.

Moving next to the fluid sealing structure of the apparatus for controlling a fluid discharge 20, there is included a means 48 for substantial fluid sealing which includes three distinct sealing interfaces, with the first sealing interface being between the conduit outlet 30 and the first gate member 38 and between the conduit outlet 30 and the second gate member 40. The second sealing interface is between the first 38 and second 40 gate members, and the third sealing interface is between the first 38 and second 40 gate members interface and the conduit outlet 30. The aforementioned means 48 for substantial fluid sealing is functional when the first 38 and second 40 gate members are in the fully closed position, thus operationally fluid sealing which is substantially sealing the fluid discharge 22 from within the conduit section 26 from migrating to the external environment 118 when the first 38 and second 40 gate members are in the fully closed position. As with any apparatus for controlling a fluid discharge 20 and more particularly any type of valve the acceptable or allowable leak rate when the valve is in the fully closed position is dependent upon the particular application of the valve being the environment of the valve and the type of fluid contained within the valve. In this particular case for the apparatus for controlling a fluid discharge 20 the preferred maximum allowable fully closed position leak rate is approximately ten (10) gallons per minute (GPM). All three aforementioned means 48 for substantial fluid sealing work together to accomplish this preferred leak rate. However, other fully closed position leak rates either being lower or higher than the aforementioned fully closed position leak rate could be determined acceptable depending upon the specifics of the apparatus for controlling a fluid discharge 20 installation location and the type of fluid 22.

Starting with the first sealing interface of the means 48 for substantial fluid sealing between the conduit outlet 30 and the first gate member 38 and the means 48 for substantial fluid sealing between the conduit outlet 30 and the second gate member 40 preferably includes a continuous gate seal 50 that is adjacent to the conduit outlet 30 as best shown in FIGS. 7, 8, 9, 10, and 14. Wherein the gate seal 50 slidably contacts each of the first 38 gate member and the second 40 gate member through the range of movement of the first 38 and second 40 gate members from the fully closed position to the fully open position and vice versa. More particularly, and referring specifically to FIG. 14, the gate seal 50 is formed from a gate seal bulb 51 defined by a gate seal bulb diameter 82 with a tangential extension 53, with the tangential extension 53 affixed to the conduit outlet 30 as best shown in FIGS. 8, 9, and 10. Specifically, looking at FIG. 14, the gate seal 50 in the exemplary embodiment of the apparatus for controlling a fluid discharge 20 has the gate seal bulb diameter 82 preferably at about one (1) inch with a tolerance of plus or minus one thirty second (1/32) of an inch. Continuing with the specifics of the gate seal 50, the gate seal bulb 51 centerline 57 distance 88 to the outer periphery 55 of the bulb 51 is about one half (½) of an inch, the tangential extension 53 has an aperture 84 for mounting by use of a fastener 54 (see FIGS. 8 and 9). The tangential extension 53 has a preferred mounting base thickness 78 of about five sixteenths (5/16) of an inch, wherein the tangential extension 53 extends from the seal bulb 51 being tangential to the seal bulb periphery 55 in accordance with the aforementioned preferred dimensions resulting in the gate seal 50 having a somewhat sideways "music note" shape. The distance 86 from the centerline 57 to the aperture 84 centerline 59 is preferably about one and three eights (1 3/8) inches with the overall length 80 of the gate seal 50 being about two and five sixteenths (2 5/16) of an inch with a tolerance of about plus or minus one sixteenth (1/16) of an inch. A radius 63 is of necessity formed between the bulb periphery 55 and the tangential extension 53 that is preferably about three eights (3/8) of an inch. The preferred materials of construction for the gate seal 50 are a combination of neoprene and fluorocarbon and more specifically having the fluorocarbon form an about thirty thousandths (0.030) of an inch thick exterior skin or band partially or alternatively fully around a core constructed of neoprene, wherein the fluorocarbon and neoprene are bonded to one another. Alternatively, the gate seal 50 could assume a number of different configurations and different material(s) of construction depending upon the specifics of the installation of the apparatus for controlling a fluid discharge 20 and the fluid 22 used. The gate seal 50 can be of an integral single piece construction, or a single piece construction formed by a plurality of segments that are vulcanized, utilize a sealant, or the like placed between the segments to form a substantially fluid tight seal between the aforementioned segments. Optionally, the gate seal 50 can be segmented into a plurality of approximately semi circular portions that are installed separately upon the conduit outlet 30 for ease of handling and installation, requiring that an appropriate vulcanization process, sealant, or the like be placed inbetween the gate seal 50 segments at installation to form a substantially fluid tight seal between the aforementioned segments. Also, preferably a plurality of fasteners 54 can be utilized to attach the gate seal 50 to the conduit outlet 30.

Operationally, referring in particular to FIGS. 8, 9, and 10, the gate seal 50 seal bulb 51 periphery 55 is relatively positioned to each of the first gate member 38 and the second gate member 40 such that the seal bulb periphery 55 is compressed or has an interference 76 of about three sixteenths (3/16) of an inch as against each of the first gate member 38 and the second gate member 40. This gate seal 50 compression of the seal bulb 51 on the periphery 55 is what constitutes the aforementioned slidable contact between the gate seal 50 bulb 51 periphery 55 and the first 38 and second 40 gate members. In addition, wherein the gate seal 50 is affixed or attached to the conduit outlet 30 utilizing the fastener 54 through the aperture 84 in the tangential extension 53 with the tangential extension 53 clamped by a mounting clamp set 52 (as best shown in FIGS. 8 and 9) thus forming the first sealing interface of the means 48 for substantial fluid sealing between the conduit outlet 30 and the first gate member 38 and the means 48 for substantial fluid sealing between the conduit outlet 30 and the second gate member 40. Optionally, the support bar 56 (referring to FIG. 10) can be added, attached, or affixed to the conduit outlet 30, when the conduit outlet 30 has insufficient surface area for affixing the gate seal 50 to the conduit outlet 30. The amount of compression of the gate seal 50 bulb periphery 55 and the particulars of affixing the gate seal 50 to the conduit outlet can be varied depending upon the specifics of the installation of the apparatus for controlling a fluid discharge 20 and the fluid 22 used.

Optionally, to further enhance the first sealing interface of the means 48 for substantial fluid sealing between the conduit outlet 30 and the first gate member 38 and the means 48 for substantial fluid sealing between the conduit outlet 30 and the second gate member 40 and to help protect the gate seal 50 from fluid 22 velocity, further included is a conduit outlet flow ring 70 that is positioned adjacent to an interior surface 37 of the conduit 26. The conduit outlet flow ring 70 forms a surrounding sidewall extending from and beyond the conduit outlet 30 as best shown in FIGS. 8, 9, and 10. The conduit outlet 30 flow ring 70 not normally contacting the first gate member 38 or the second gate member 40. The conduit outlet flow ring 70 is operational to help shield the gate seal 50 from the fluid discharge 22, particularly the fluid discharge 22 velocity, allowing the gate seal 50 to operate in more of a static fluid 22 environment to reduce potential damage to the gate seal 50. The conduit outlet flow ring 70 is preferably positioned adjacent to the conduit interior surface 37 to form a substantially smooth surface transitioning from the conduit interior surface 37 to the conduit outlet ring 70 as best shown in FIGS. 8, 9, and 10. The attachment of the conduit outlet ring 70 to the conduit interior surface 37 can be by shrink fit, welding, fasteners, and the like. The axial positioning of the conduit outlet ring 70 relative to the conduit outlet 30 or in other words the aforementioned surrounding sidewall extending of the conduit outlet ring 70 from and beyond the conduit outlet 30 is controlled by a clearance 74 (see FIG. 8) that is preferably a maximum of about one sixteenth (1/16) of an inch between the conduit outlet ring 70 and both of the first 38 and second gate 40 members. The setting of the clearance 74 can be accomplished by the dimensions and tolerances of the associated elements and/or by the use of the aforementioned slidable lockable engagement of the trunnions 44 to the conduit exterior 35 that allows the axial position (being parallel to the conduit longitudinal axis 27) of the first 38 and second 40 gate members to be set relative to the conduit outlet 30. Another alternative for setting the axial positioning of the conduit outlet ring 70 relative to the conduit outlet 30 or in other words the aforementioned surrounding sidewall extending of the conduit outlet ring 70 from and beyond the conduit outlet 30 is controlled by a clearance 74 (see FIG. 8) would be by removing material from the conduit outlet ring 70 adjacent to clearance 74 by for example filing, grinding, machining, and the like. Additionally, when the first 38 and second 40 gate members are in the fully open position a clearance 72 to set the fully open position of the first 38 and second 40 gate members as against the conduit outlet flow ring 70 and subsequently the conduit outlet 30. The preferred dimension of the clearance 72 is about three sixteenths (3/16) of an inch as best shown in FIG. 8. Clearance 72 is preferably set by adjustment in the means 42 for rotatably mounting the first 38 and second 40 gate members and/or the means 46 for moving the first 38 and second 40 gate members. The materials of construction for the conduit outlet flow ring 70 are preferably brass or a like material.

Again optionally, referring specifically to FIGS. 5 and 10, to further enhance the first sealing interface of the means 48 for substantial fluid sealing between the conduit outlet 30 and the first gate member 38 and the means 48 for substantial fluid sealing between the conduit outlet 30 and the second gate member 40, the conduit outlet flow ring 70 includes a plurality of apertures 71 in the surrounding sidewall extending from and beyond the conduit outlet 30 are positioned substantially within a range of about sixteen (16) degrees centered about the conduit X axis 29 at the conduit outlet 30. The conduit X axis 29 at the conduit outlet 30 is substantially adjacent to the interface of the first 38 and second 40 gate members when in the fully closed position. The preferred size of the apertures 71 is about one eighth (1/8) of an inch in diameter. The apertures 71 are operational to help equalize or relieve a pressure, thus controlling a pressure of the fluid discharge 22 between the conduit interior 35 and a gate seal fluid chamber 91 when the first 38 and second 40 gate members are in the fully closed position or nearly closed position respectively, thus as the first 38 and second 40 gate members are approaching and stopping in the fully closed position.

Further again optionally, again referring specifically to FIG. 10, to further enhance the first sealing interface of the means 48 for substantial fluid sealing between the conduit outlet 30 and the first gate member 38 and the means 48 for substantial fluid sealing between the conduit outlet 30 and the second gate member 40 further included is a plurality of elastomeric segments 90. Each the elastomeric segments 90 being about two (2) inches long positioned adjacent to the conduit outlet 30 and the surrounding sidewall of the conduit outlet ring 70 extending from and beyond the conduit outlet 30 with the elastomeric segments 90 being positioned within the gate seal fluid chamber 91. The elastomeric segments 90 are also positioned substantially centered lengthwise within a range of about sixteen (16) degrees centered about the conduit X axis 29 at the conduit outlet 30. Additionally, the elastomeric segments 90 are sized and configured to provide about an one sixteenth (1/16) inch clearance 120, essentially forming the fluid chamber 91 to the gate seal 50 when the gate seal 50 is compressed about one eighth (1/8) inch from the first 38 and second 40 gate members. The elastomeric segments 90 are operational to provide the gate seal 50 with a support to help prevent excessive distortion of the gate seal 50 from the aforementioned compression as against the first 38 and second 40 gate members and from the fluid 22 pressure loading or in other words to help prevent the gate seal 50 from protruding between the first 38 and second 40 gate members.

Continuing on to the second sealing interface, specifically referring to FIGS. 5, 6, and 7 for the means 48 for substantial fluid sealing between the first 38 and second 40 gate members in the exemplary embodiment of the apparatus for controlling a fluid discharge 20 is preferably accomplished by a labyrinth interface 61 utilizing a continuous elastomeric strip 92 positioned parallel to the labyrinth interface 61. Wherein the elastomeric strip 92 is partially axially compressed in the labyrinth interface 61 that is operational to form the second sealing interface when the first 38 and second 40 gate members are in the fully closed position. The compression of the elastomeric strip is preferably about fifty (50) percent axially with the compression substantially parallel to the conduit longitudinal axis 27. The materials of construction for the elastomeric strip 92 is preferably neoprene or a similar type of material. Optionally, the second sealing interface for the means 48 for substantial fluid sealing between the first 38 and second 40 gate members can include for the labyrinth interface 61 a first seat 58 that is adjacent to the first gate member 38 and a second seat 60 that is adjacent to the second gate member 40. Wherein the first 58 and second 60 seats contact forming the labyrinth interface 61, and in addition the first 58 and second 60 seats form an elastomeric strip cavity 93 that is sized and configured for the aforementioned elastomeric strip 92 compression. More specifically, the cavity 93 is shaped somewhat in the shape of a portion of a right triangle, wherein the first seat 58 in forming a portion of the labyrinth 61 also has a right triangle portion side two 124 that has a length 94 being preferably about one (1) inch terminating in an angled portion forming angle 96 that is preferably about fifty six (56) degrees. The mating portion of the labyrinth 61 in the second seat 60 is a seat clearance surface 102 that has an angle 103 of preferably about thirty four (34) degrees, and in forming a mating portion of the cavity 93 being specifically the right triangle portion, an angle 98 is preferably about fourteen (14) degrees that extends for a distance 100 that is preferably about seven eighths (7/8) of an inch. This distance 100 also termed an elastomeric strip 92 contact length and is what compresses the elastomeric strip 92 when the first 38 and second 40 gate members are in the fully closed position. The materials of construction for the first seat 58 and the second seat 60 are constructed of materials selected from the group consisting essentially of brass, bronze, copper, and zinc. Preferably, for the exemplary embodiment of the apparatus for controlling a fluid discharge 20 the material of construction for the first seat 58 and the second seat 60 is brass, or the use of alternative materials as previously described. The attachment of the first 58 and second 60 seats to the first 38 and second 40 gate members is preferably by fasteners, however, other attachment structures would be acceptable such as shrink fit, pins (shrink or slidable), a removable engagement (dove tail and the like), adhesives, and welding or brazing or both welding and brazing.

Further, continuing with the second sealing interface, again specifically referring to FIGS. 5, 6, and 7 for the means 48 for substantial fluid sealing between the first 38 and second 40 gate members, the aforementioned cavity 93 is in the form of a portion of a right triangle including two perpendicular sides respectively delineated as right triangle portion perpendicular side one 122, right triangle portion perpendicular side two 124, and a right triangle portion angled side 126, the right triangle portion is substantially perpendicular to the labyrinth interface 61. Again, preferably the angle 98 is about fourteen (14) degrees. The portion of a right triangle is defined as a right triangle that has the perpendicular side one 122 and the perpendicular side two 124 intersecting and having the angled side 126 only intersecting the perpendicular side one 122 and with the angled side 126 not intersecting perpendicular side two 124. The angled side 126 is operational to wedge the elastomeric strip 92 into the cavity 93 when the first 58 and second 60 seats contact when the first gate member 38 and said second gate member 40 move from an open position to the fully closed position.

Further, continuing with the third sealing interface, specifically referring to FIG. 7, for the means 48 for substantial fluid sealing between the first 38 and second 40 gate members interface and the conduit outlet 30 is accomplished by an elastomeric plug 104 retained by a setscrew 106 positioned within the second gate member 40. Wherein the elastomeric plug 104 contacts the conduit outlet 30 in conjunction with a portion of the interface between the first 38 and second 40 gate members. The materials of construction for the elastomeric plug 104 are preferably neoprene or a similar type of material. More particularly, the elastomeric plug 104 is formed to provide a three way sealing between three different elements; being the labyrinth interface between the first seat 58 and the second seat 60 and the gate seal 50. Thus, the third sealing interface helps to prevent fluid 22 leakage from migrating along the labyrinth interface 61, specifically the labyrinth split line 107, see FIGS. 5 and 7, with the labyrinth split line 107 being substantially parallel to the conduit X axis 29, that allows the leakage that is migrating past the gate seal 50 and going to the external environment 118 when the first 38 and second 40 gate members are in the closed position. This third sealing interface occurs where the labyrinth forms a split line 107, again looking specifically at FIG. 7, and the gate seal 50 cannot have enough flexibility to "fill in" to completely seal the labyrinth split line 107 leak path. Thus the elastomeric plug 104 is preferably formed 108 at the labyrinth split line 107 and being positioned radially adjacent to the gate seal 50 as shown in FIG. 7, having the elastomeric plug 104 formed 108 to help block the aforementioned leak path that is formed between at the labyrinth split line 107 and the gate seal 50, by having the elastomeric plug 104 contact the first seat 58 and the second seat 60 both at the labyrinth split line, and the gate seal 50 portion that is adjacent to the labyrinth split line 107, resulting in a reduction of fluid 22 leakage at the labyrinth split line 107 past the gate seal 50 substantially along the conduit X axis 29 at the conduit outlet 30 with the first 38 and second 40 gate members in the fully closed position. Preferably a pair of elastomeric plugs 104 and associated elements as previously described would be used, with one at each labyrinth split line 107 and gate seal 50 interface thus forming the third sealing interface for the means 48 for substantial fluid sealing between the first 38 and second 40 gate members interface and the conduit outlet 30.

CONCLUSION

Accordingly, the present invention of an apparatus for controlling fluid discharge has been described with some degree of particularity directed to the embodiment(s) of the present invention. It should be appreciated, though, that the present invention is defined by the following claims construed in light of the prior art so modifications or changes may be made to the exemplary embodiment(s) of the present invention without departing from the inventive concepts contained therein.

What is claimed is:

1. An apparatus for controlling a fluid discharge through an opening in a conduit, comprising:
   (a) a conduit section including a conduit inlet, a conduit interior, and a conduit exterior, said conduit section also including a conduit outlet having a continuously curved perimeter surface defining said conduit opening that includes oppositely disposed concave sections and oppositely disposed convex sections, wherein said concave and convex sections are continuous, said convex sections are operational to help reduce fan out of the discharge fluid from said conduit opening;
   (b) a first arcuately curved gate member and a second arcuately curved gate member;
   (c) means for rotatably mounting said first and second gate members externally to said conduit, said first and second gate members are operational to move from a fully closed position to a fully open position, said first and second gate members in the fully closed position are adjacent to said conduit outlet and have an adjacent interface to each other, as said first and second gate members transition to the fully open position from the fully closed position said first and second gate members remain adjacent to said conduit outlet, said first and second gate members transitioning substantially symmetrically from the fully closed position to the fully open position remaining adjacent to said concave sections in the fully open position;
   (d) means for moving said first and second gate members between the fully closed position and the fully open position, wherein said first and second gate members are operational to control the fluid discharge through said conduit outlet; and
   (e) means for substantial fluid sealing between said conduit outlet and said first gate member, between said conduit outlet and said second gate member, between said first and second gate members, and between said first and second gate members interface and said conduit outlet, when said first and second gate members are in the fully closed position.

2. An apparatus for controlling a fluid discharge through an opening in a conduit according to claim 1 wherein said means for substantial fluid sealing between said conduit outlet and said first gate member, and said means for substantial fluid sealing between said conduit outlet and said second gate member includes a continuous gate seal adjacent to said conduit outlet, wherein said gate seal slidably contacts each of said first gate member and said second gate member.

3. An apparatus for controlling a fluid discharge through an opening in a conduit according to claim 2 wherein said gate seal is formed from a seal bulb with a tangential extension, with said tangential extension affixed to said conduit outlet.

4. An apparatus for controlling a fluid discharge through an opening in a conduit according to claim 3 wherein said gate seal is constructed of neoprene and fluorocarbon.

5. An apparatus for controlling a fluid discharge through an opening in a conduit according to claim 4 wherein said seal bulb is relatively positioned to each of said first gate member and said second gate member such that said seal bulb is compressed about three sixteenths ($3/16$) of an inch as against each of said first gate member and said second gate member.

6. An apparatus for controlling a fluid discharge through an opening in a conduit according to claim 2 further comprising a conduit outlet flow ring positioned adjacent to an interior surface of said conduit, said conduit outlet flow ring forming a surrounding sidewall extending from and beyond said conduit outlet, said conduit outlet flow ring not contacting said first gate member or said second gate member, wherein said conduit outlet flow ring is operational to help shield said gate seal from the fluid discharge.

7. An apparatus for controlling a fluid discharge through an opening in a conduit according to claim 6 wherein said conduit outlet flow ring includes a plurality of apertures in said surrounding sidewall extending from and beyond said conduit outlet, said apertures positioned substantially within a range of about sixteen (16) degrees centered about a conduit X axis at said conduit outlet, said apertures are operational to help control a pressure of the fluid discharge between said conduit interior and a gate seal fluid chamber when said first and second gate members are approaching and stopping in the fully closed position.

8. An apparatus for controlling a fluid discharge through an opening in a conduit according to claim 6 further comprising a plurality of elastomeric segments, each said elastomeric segment being about two (2) inches long positioned adjacent to said conduit outlet and said surrounding sidewall extending from and beyond said conduit outlet forming a gate seal fluid chamber, said elastomeric segments also positioned substantially centered lengthwise within a range of about sixteen (16) degrees centered about the conduit X axis at said conduit outlet, said elastomeric segment sized and configured to provide about an one sixteenth ($1/16$) inch clearance to said gate seal when said gate seal is compressed about one eighth ($1/8$) inch from said first and second gate members, said elastomeric segment is operational to provide said gate seal with a support.

9. An apparatus for controlling a fluid discharge through an opening in a conduit according to claim 1 wherein said means for substantial fluid sealing between said first and second gate members is accomplished by a labyrinth interface utilizing a continuous elastomeric strip positioned parallel to said interface, wherein said elastomeric strip is partially axially compressed.

10. An apparatus for controlling a fluid discharge through an opening in a conduit according to claim 9 wherein said labyrinth interface includes a first seat that is adjacent to said first gate member and a second seat that is adjacent to said second gate member, wherein said first and second seats contact forming a cavity that is sized and configured for said elastomeric strip.

11. An apparatus for controlling a fluid discharge through an opening in a conduit according to claim 10 wherein said cavity is in the form of a portion of a right triangle including two perpendicular sides and an angled side, said portion of a right triangle is substantially perpendicular to said interface, said angled side is operational to wedge said elastomeric strip into said cavity when said first and second seats contact when said first gate member and said second gate member move from an open position to the fully closed position.

12. An apparatus for controlling a fluid discharge through an opening in a conduit according to claim 10 wherein said first seat and said second seat are constructed of materials selected from the group consisting essentially of brass, bronze, copper, and zinc.

13. An apparatus for controlling a fluid discharge through an opening in a conduit according to claim 9 wherein said elastomeric strip is constructed of neoprene.

14. An apparatus for controlling a fluid discharge through an opening in a conduit according to claim 1 wherein said means for substantial fluid sealing between said first and second gate members interface and said conduit outlet is accomplished by an elastomeric plug retained within said second gate member, wherein said elastomeric plug contacts said conduit outlet in conjunction with a portion of said interface.

15. An apparatus for controlling a fluid discharge through an opening in a conduit according to claim 14 wherein said elastomeric plug is constructed of neoprene.

16. An apparatus for controlling a fluid discharge through an opening in a conduit according to claim 14 wherein said elastomeric plug is formed to contact a gate seal adjacent to said conduit outlet and a labyrinth portion of said interface.

17. An apparatus for controlling a fluid discharge through an opening in a conduit, comprising:
   (a) a conduit section including a conduit inlet, a conduit interior, and a conduit exterior, said conduit section also including a conduit outlet having a continuously curved perimeter surface defining said conduit opening that includes oppositely disposed concave sections and oppositely disposed convex sections, wherein said concave and convex sections are continuous, said convex sections are operational to help reduce fan out of the discharge fluid from said conduit opening;
   (b) a first arcuately curved gate member and a second arcuately curved gate member;
   (c) a pair of trunnions, each trunnion adjacent to an opposite side of said conduit exterior, a first set of support arms attached to said first gate member, said first set of support arms also rotatably attached to said trunnions, and a second set of support arms attached to said second gate member, said second set of support arms also rotatably attached to said trunnions, said trunnions, first set of support arms, and second set of support arms are operational to move said first and second gate members from a fully closed position to a fully open position, said first and second gate members in the fully closed position are adjacent to said conduit outlet and have an adjacent interface to each other, as said first and second gate members transition to the fully open position from the fully closed position said first and second gate members remain adjacent to said conduit outlet, said first and second gate members in the fully open position remain adjacent to said concave sections in the fully open position;
   (d) means for moving said first and second gate members between the fully closed position and the fully open position, wherein said first and second gate members are operational to control the fluid discharge through said conduit outlet; and
   (e) means for substantial fluid sealing between said conduit outlet and said first gate member, between said conduit outlet and said second gate member, between said first and second gate members, and between said first and second gate members interface and said conduit outlet, when said first and second gate members are in the fully closed position.

18. An apparatus for controlling a fluid discharge through an opening in a conduit according to claim 17 further comprising a linkage that is pivotally attached to said first and second set of support arms, said linkage also slidably engaged to said conduit exterior, said linkage is operational to cause substantially equal and opposite movement of said first and second gate members.

19. An apparatus for controlling a fluid discharge through an opening in a conduit according to claim 17 wherein said means for moving said first and second gate members between the fully closed position and the fully open position is accomplished by a linear actuator attached between said conduit exterior and pivotally attached to said first and second gate members.

20. An apparatus for controlling a fluid discharge through an opening in a conduit according to claim 19 wherein said linear actuator is selected from the group consisting essentially of hydraulic actuators, pneumatic actuators, and mechanical actuators.

21. An apparatus for controlling a fluid discharge through an opening in a conduit according to claim 17 wherein each said trunnion that is adjacent to an opposite side of said conduit exterior is attached to said conduit exterior by a slidable lockable engagement that is operational to allow said trunnions to move substantially parallel to a longitudinal axis of said conduit section allowing a clearance to be set between said conduit outlet and said first and second gate members.

22. An apparatus for controlling a fluid discharge through an opening in a conduit according to claim 17 wherein said means for substantial fluid sealing between said conduit outlet and said first gate member, and said means for substantial fluid sealing between said conduit outlet and said second gate member includes a continuous gate seal adjacent to said conduit outlet, wherein said gate seal slidably contacts each of said first gate member and said second gate member.

23. An apparatus for controlling a fluid discharge through an opening in a conduit according to claim 22 wherein said gate seal is formed from a seal bulb with a tangential extension, with said tangential extension affixed to said conduit outlet.

24. An apparatus for controlling a fluid discharge through an opening in a conduit according to claim 23 wherein said gate seal is constructed of neoprene and fluorocarbon.

25. An apparatus for controlling a fluid discharge through an opening in a conduit according to claim 24 wherein said seal bulb is relatively positioned to each of said first gate member and said second gate member such that said seal bulb is compressed about three sixteenths ($3/16$) of an inch as against each of said first gate member and said second gate member.

26. An apparatus for controlling a fluid discharge through an opening in a conduit according to claim 22 further comprising a conduit outlet flow ring positioned adjacent to an interior surface of said conduit, said conduit outlet flow ring forming a surrounding sidewall extending from and beyond said conduit outlet, said conduit outlet flow ring not contacting said first gate member or said second gate member, wherein said conduit outlet flow ring is operational to help shield said gate seal from the fluid discharge.

27. An apparatus for controlling a fluid discharge through an opening in a conduit according to claim 26 wherein said conduit outlet flow ring includes a plurality of apertures in said surrounding sidewall extending from and beyond said conduit outlet, said apertures positioned substantially within a range of about sixteen (16) degrees centered about a conduit X axis at said conduit outlet, said apertures are operational to help control a pressure of the fluid discharge between said conduit interior and a gate seal fluid chamber when said first and second gate members are approaching and stopping in the fully closed position.

28. An apparatus for controlling a fluid discharge through an opening in a conduit according to claim 26 further comprising a plurality of elastomeric segments, each said elastomeric segment being about two (2) inches long positioned adjacent to said conduit outlet and said surrounding sidewall extending from and beyond said conduit outlet forming a gate seal fluid chamber, said elastomeric segments also positioned substantially centered lengthwise within a range of about sixteen (16) degrees centered about the conduit X axis at said conduit outlet, said elastomeric segment sized and configured to provide about an one sixteenth (1/16) inch clearance to said gate seal when said gate seal is compressed about one eighth (1/8) inch from said first and second gate members, said elastomeric segment is operational to provide said gate seal with a support.

29. An apparatus for controlling a fluid discharge through an opening in a conduit according to claim 17 wherein said means for substantial fluid sealing between said first and second gate members is accomplished by a labyrinth interface utilizing a continuous elastomeric strip positioned parallel to said interface, wherein said elastomeric strip is partially axially compressed.

30. An apparatus for controlling a fluid discharge through an opening in a conduit according to claim 29 wherein said labyrinth interface includes a first seat that is adjacent to said first gate member and a second seat that is adjacent to said second gate member, wherein said first and second seats contact forming a cavity that is sized and configured for said elastomeric strip.

31. An apparatus for controlling a fluid discharge through an opening in a conduit according to claim 30 wherein said cavity is in the form of a portion of a right triangle including two perpendicular sides and an angled side, said portion of a right triangle is substantially perpendicular to said interface, said angled side is operational to wedge said elastomeric strip into said cavity when said first and second seats contact when said first gate member and said second gate member move from an open position to the fully closed position.

32. An apparatus for controlling a fluid discharge through an opening in a conduit according to claim 30 wherein said first seat and said second seat are constructed of materials selected from the group consisting essentially of brass, bronze, copper, and zinc.

33. An apparatus for controlling a fluid discharge through an opening in a conduit according to claim 29 wherein said elastomeric strip is constructed of neoprene.

34. An apparatus for controlling a fluid discharge through an opening in a conduit according to claim 17 wherein said means for substantial fluid sealing between said first and second gate members interface and said conduit outlet is accomplished by an elastomeric plug retained within said second gate member, wherein said elastomeric plug contacts said conduit outlet in conjunction with a portion of said interface.

35. An apparatus for controlling a fluid discharge through an opening in a conduit according to claim 34 wherein said elastomeric plug is constructed of neoprene.

36. An apparatus for controlling a fluid discharge through an opening in a conduit according to claim 34 wherein said elastomeric plug is formed to contact a gate seal adjacent to said conduit outlet and a labyrinth portion of said interface.

* * * * *